US 8,291,428 B2

(12) United States Patent
Richter et al.

(10) Patent No.: US 8,291,428 B2
(45) Date of Patent: Oct. 16, 2012

(54) LOW BURDEN SYSTEM FOR ALLOCATING COMPUTATIONAL RESOURCES IN A REAL TIME CONTROL ENVIRONMENT

(75) Inventors: John C. Richter, Tucson, AZ (US); Joseph B. Lail, Tucson, AZ (US); Jason J. Kelly, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 931 days.

(21) Appl. No.: 12/363,323

(22) Filed: Jan. 30, 2009

(65) Prior Publication Data

US 2010/0199282 A1     Aug. 5, 2010

(51) Int. Cl.
*G06F 9/50*     (2006.01)
(52) U.S. Cl. ................................... 718/104
(58) Field of Classification Search .......... None
See application file for complete search history.

(56) References Cited

U.S. PATENT DOCUMENTS

| | | | |
|---|---|---|---|
| 6,282,561 B1 | 8/2001 | Jones et al. | |
| 7,096,471 B2 | 8/2006 | Kosanovic | |
| 7,512,512 B2 * | 3/2009 | Foote et al. | 702/127 |
| 2006/0227350 A1 * | 10/2006 | Crawford et al. | 358/1.12 |
| 2006/0230201 A1 * | 10/2006 | Fromherz et al. | 710/62 |

* cited by examiner

*Primary Examiner* — Eric Coleman
(74) *Attorney, Agent, or Firm* — Eric A. Gifford

(57) ABSTRACT

A low processing overhead resource manager for a control system uses the control system operating state as a proxy for processing resource capacity, making judgments about execution of asynchronous services based on empirically derived data linked to the states. The control system exists in one of a plurality of predefined operating states logically related to the real-time control of the equipment. A resource model provides predefined processing reserves as a function of operating state, which is based on the control variables representing inputs outputs to and from the equipment. A simple assessment of the operating state determines the process reserves for asynchronous non real-time services.

19 Claims, 3 Drawing Sheets

LOW BURDEN SYSTEM FOR ALLOCATING COMPUTATIONAL RESOURCES IN A REAL TIME CONTROL ENVIRONMENT

FIELD OF THE INVENTION

The present invention relates generally to computerized control systems and particularly to a resource management system allowing asynchronous services to be executed on a control system without jeopardizing a synchronous control process.

BACKGROUND OF THE INVENTION

Computerized control systems must execute "real-time" control programs in a predictable and timely fashion responding to sensor signals from the process to provide responsive control signals in return. Such control systems normally operate in a synchronous fashion, for example, by executing the control programs in a predefined and unvarying cyclic period. Computerized control systems may find use in weapons systems, such as missiles, where synchronous execution ensures that critical tasks, such as missile guidance, are attended to properly.

Often, it may be desirable to permit a computerized control system to execute asynchronous services that are not critical for the control mission. Asynchronous in this context means that the services are not regularly executed as part of the control cycle but occur occasionally according to requests that are asynchronous with respect to that control cycle. For example, in a missile control system, it may be desirable to provide a video feed from the missile cameras to a remote command center. When services are executed on the same computer resources as used for the control program, care must be taken that they do not to jeopardize critical control tasks. This can be particularly challenging since performance of these asynchronous tasks often place an additional processing burden on the time-critical real time tasks.

A variety of techniques are known for allocating finite processing resources among different computational tasks. Such systems normally have a resource manager that measures or computes a resource requirement for each task and then sums the requirements of currently executing tasks to compare that sum to the available resources in deciding whether to allow the execution of a new task based on its resource requirement. The resource manager operates during execution of the tasks to dynamically reassess resource allocation on a regular basis.

For this technique to work, the tasks are normally sized to represent a small portion of computational resources so as to present substantially constant resource requirements during their time of operation. This allows the resource manager to assume a substantially constant resource requirement during the task execution.

Normally the tasks also have a priority assigned to them based on the task type. In the event of oversubscription to the computational resources, tasks may be denied execution based on a policy using these task-based priorities.

Running a resource manager is computationally expensive and can substantially decrease the total amount of computational resources available for control tasks and services alike, effectively consuming the resources the resource manager is trying to protect. The computational burden arises from the need by the resource manager to frequently interrupt program flow to measure resource utilization and the time required to implement a complex management strategy. This problem is particularly acute in embedded control systems, such as those in a missile, where processor resources are severely limited.

SUMMARY OF THE INVENTION

The present invention provides a low-burden resource management system particularly suited for allowing asynchronous services to be executed on the same computer system executing synchronous control tasks. A key aspect of this invention is managing the resource demands of the asynchronous services when they place an additional processing burden on the synchronous control tasks. The present inventors have recognized that the synchronous control tasks, taken in the aggregate, tend to present relatively stable computational demands within a limited set of control states that can be readily defined for the control process. These states serve as proxies for available computational resources eliminating much of the computational overhead of the resource management system. Further, by treating the control tasks in the aggregate additional computational efficiencies are gained.

The invention pre-characterizes the asynchronous services, determining whether to execute them through a simple assessment of the state of the control system mapped to predetermined resource reserves. By eliminating the need for real-time monitoring of many different tasks, the resource manager may be practically run in conjunction with control tasks with minimal disruption to the control tasks. In the event of an oversubscription of computational resources by asynchronous services, allocation may be refined by priorities based on the requester of the service, and/or negotiation for lower levels of service particularly for cyclic asynchronous services where the cycle time may be reduced.

Specifically then, the present invention provides a method and apparatus for executing asynchronous services on a computer system providing real-time control of equipment. The method includes the steps of: characterizing an operating state of the computer system during real-time control based on the control variables and applying that state to a resource model of computational reserves to determine a processing reserve. A burden model of asynchronous services is used to provide an incremental burden for an asynchronous service to be executed. During operation of the computer system the sum of incremental burdens of currently operating asynchronous services, including the additional burden that may be placed on the synchronous processing, are compared against the processing reserve for the particular operating state to determine whether or how to execute the service.

It is thus a feature of at least one embodiment of the invention to provide efficient resource allocation suitable for a resource limited control system. By evaluating a collection of control tasks of implicit high priority, a statistically uniform reserve can be associated with one of a relatively low number of states eliminating the need for real time measurement of resource reserve. It is thus another feature of at least one embodiment of the invention to provide a resource monitoring system that does not require modification to the control software to include "instrumentation" code necessary to monitor resource use.

The resource model may model reserves of multiple processing resources.

It is thus another feature of at least one embodiment of the invention to provide a method that can evaluate multiple dimensions of processing resource, for example multiple processors or the like.

The operating state may be deduced both from current and historical control variables.

It is thus a feature of at least one embodiment of the invention to provide a sophisticated state variable that serves as an accurate proxy for resource availability but that nevertheless avoids direct monitoring of processor resources.

The resource management system of the invention can be executed synchronously with tasks of the real-time control executed by the computer system.

It is thus a feature of at least one embodiment of the invention to permit the resource manager to be integrated into a synchronous control loop without unduly slowing that loop The processing resources may be selected from the group consisting of: processors, buses, radio links, memory, and equipment components.

It is thus a feature of at least one embodiment of the invention to provide a system that may flexibly operate not only with different processing resources but also with hardware components that can form the basis between complex programs even if they are infinitely shareable.

The resource model may be derived from empirical measurements of the computer system executing the control tasks, for example stored in a lookup table, and the reserves may represent a fraction of the empirical measurement.

It is thus a feature of at least one embodiment of the invention to provide a system that does not require detailed understanding of the control tasks.

The method may cancel lower priority asynchronous services upon a request for execution of a higher priority asynchronous service when there is a lack of sufficient reserve for the higher priority asynchronous service.

Thus it is a feature of at least one embodiment of the invention to accommodate priorities among asynchronous services. It is further a feature of at least one embodiment of the invention to provide a priority that is independent of the service type but depends on the requester as is suitable for military applications.

Alternatively or in addition, the method may negotiate a degraded execution of the asynchronous service when evaluation indicates lack of sufficient reserve for the higher priority asynchronous service.

It is thus a feature of at least one embodiment of the invention to permit flexible accommodation of services in a manner unique to control systems which have cyclic services associated with data collection.

Alternatively the method may delay execution of the asynchronous service when evaluation indicates lack of sufficient reserve for the higher priority asynchronous service.

It is thus a feature of at least one embodiment of the invention to provide a graceful handling of services that cannot be accommodated without jeopardizing the control mission of the control program.

The asynchronous services may indicate hardware state parameters and the resource model may also indicates hardware states so that an evaluation of hardware state parameters in a request for execution of an asynchronous service can be made against the hardware states of the resource model to determine whether to execute the service.

It is thus a feature of at least one embodiment of the invention to accommodate asynchronous service requests that do not overtax the processing resources but are inconsistent with resource states.

The burden model may evaluate the asynchronous service on a timeframe substantially equal to a lowest cycle time of control tasks executing to provide the real-time control.

It is thus a feature of at least one embodiment of the invention to provide data particularly suited for the cyclic control environment.

These particular objects and advantages may apply to only some embodiments falling within the claims and thus do not define the scope of the invention.

DETAILED DESCRIPTION OF THE PREFERRED EMBODIMENT

Figure 1:
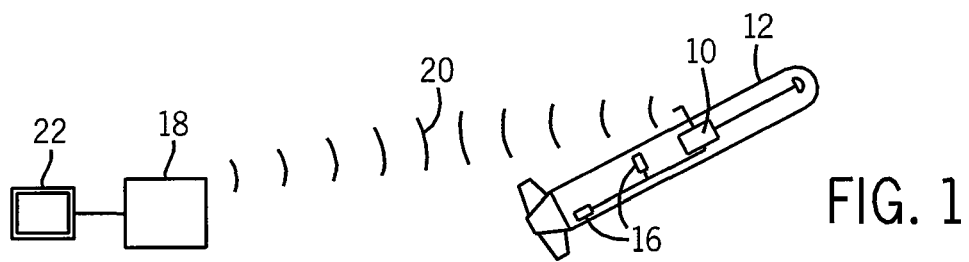
FIG. 1 is a simplified diagram of a missile system having synchronous control tasks and receiving asynchronous service requests.

Referring now to FIG. 1, the present invention provides a control system 10 for use in controlling a machine 12. In a nonlimiting example, the machine 12 may be a missile, and the control system 10, communicating with sensors 14 and actuators 16, may provide control of critical missile functions through the execution of a synchronous control program to be described.

During operation, the control system 10 may receive, for example, from a remote command center 18, one or more asynchronous requests for the execution of additional asynchronous services via radio signal 20. An example of such an asynchronous service would be a request for a data stream from one or more sensors 14 of the missile system, for example, a video feed from a video sensor 14 permitting a video display on a video monitor 22 associated with the command center 18.

Figure 2:
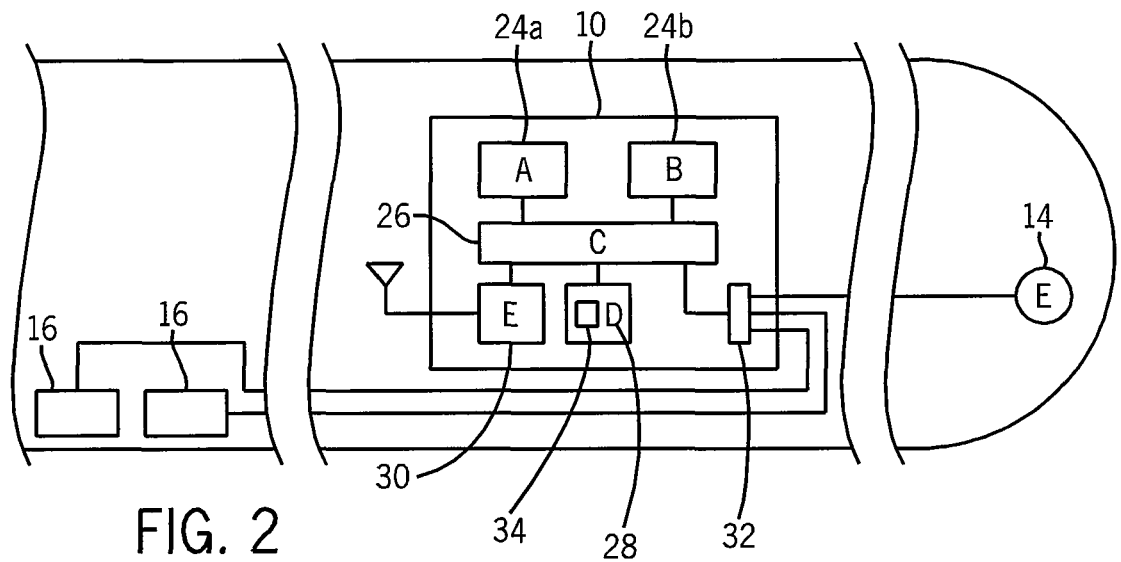
FIG. 2 is a fragmentary block diagram of the components of the control system of the missile of FIG. 1 showing various processing resources including processors and memory and showing control sensors and actuators.

Referring now to FIG. 2, the control system 10 may employ multiple processors 24a and 24b communicating with each other on a common bus 26 and with a memory 28, a radio transceiver 30, and interface circuits 32, the latter communicating with the sensors 14 and actuators 16. As noted above, one sensor 14 is a nose video camera; however, other sensors including those providing critical data about the missile guidance system also communicate with the interface circuits 32. Actuator 16 includes those providing actuation of control surfaces and an actuator for steering the video sensor 14. The memory 28 may hold programs 34 including a resource management program of the present invention as will now be described.

Figure 3:
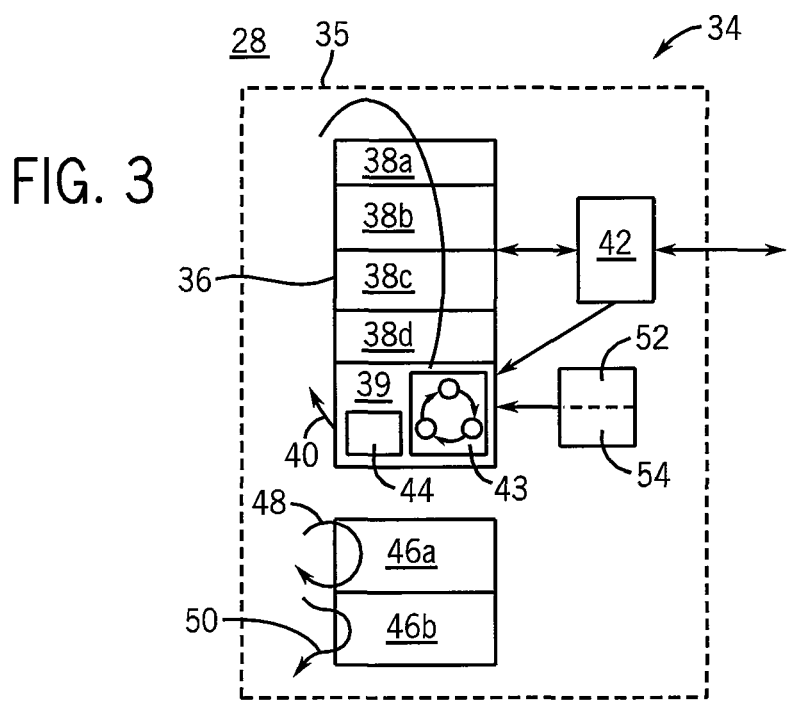
FIG. 3 is a logical representation of the memory of FIG. 2 showing the synchronous control tasks and asynchronous services, the former including a resource management program having a resource manager and a state machine communicating with control variables and reserve and burden models in the form of tables.

Referring to FIG. 3, the programs 34 held in the memory 28 execute within an operating environment 35, for example, provided by a real-time operating system of the type generally known in the art. Included in the programs 34 are control programs 36 including multiple synchronous control tasks 38a-d necessary, for example, for missile guidance and operation. Each of these synchronous control tasks 38a-d may execute repeatedly in a well-defined cycle 40 to ensure timely service of the necessary control operations. In one embodiment, each of the synchronous control tasks 38a-d may communicate with an I/O table 42 collecting control variables representing command outputs to the actuators 16 and sensed inputs from the sensors 14. The I/O table 42 may be filled asynchronously and then temporarily locked to create a snapshot used for the control cycle 40.

In one embodiment, a resource allocation program 39 including a state machine 43 and a resource allocator 44 (whose operation will be described) is executed synchronously with synchronous control tasks 38a-d requiring only a small and predictable fraction of the cycle 40.

Referring still to FIG. 3, the programs 34 in the memory 28 may also include asynchronous services 46a and 46b which may run cyclically as indicated by arrow 48 or episodically (non-cyclically) as indicated by arrow 50 on an occasional basis based on occasional service requests to be described.

Generally the resource allocation program 39 provides a low overhead allocation of excess processor resources (reserves) to asynchronous services 46a and 46b. In this regard the resource allocation program 39 employs empirically defined reserve models 52 and burden models 54 as will be described below. Excess processor resources used by these other tasks may include asynchronous services 46a and 46b having instruction codes held in the memory 28 and executing either cyclically, as indicated by arrow 48, or non-cyclically, as indicated by arrow 50, on an occasional basis based on service requests.

Figure 6:
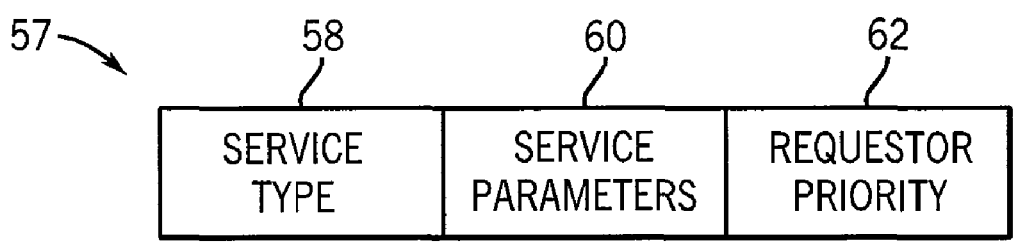
FIG. 6 is a representation of a service request showing its various component fields.

Referring momentarily to FIG. 6, a service request 57 for execution of an asynchronous service 46a or 46b, for example, coming from the command center 18, may include a service type 58 identifying a particular asynchronous service 46a or 46b held in memory 28 as well as service parameters 60 that describes input data necessary for the asynchronous services 46a and 46b. In one illustrative example, the service parameters 60 may describe, in the case of a requested video feed, a frame rate and a camera orientation. The service request 57 will also include a requester priority 62 indicating the source of the service request, for example the military rank of the requestor. Generally the requester priority 62 is independent of the service type and indicates a level in the chain of command for the request. Under this system, a given service type 58 may have different service requester priority 62 depending on the authority of the person issuing the service request.

Figure 4:
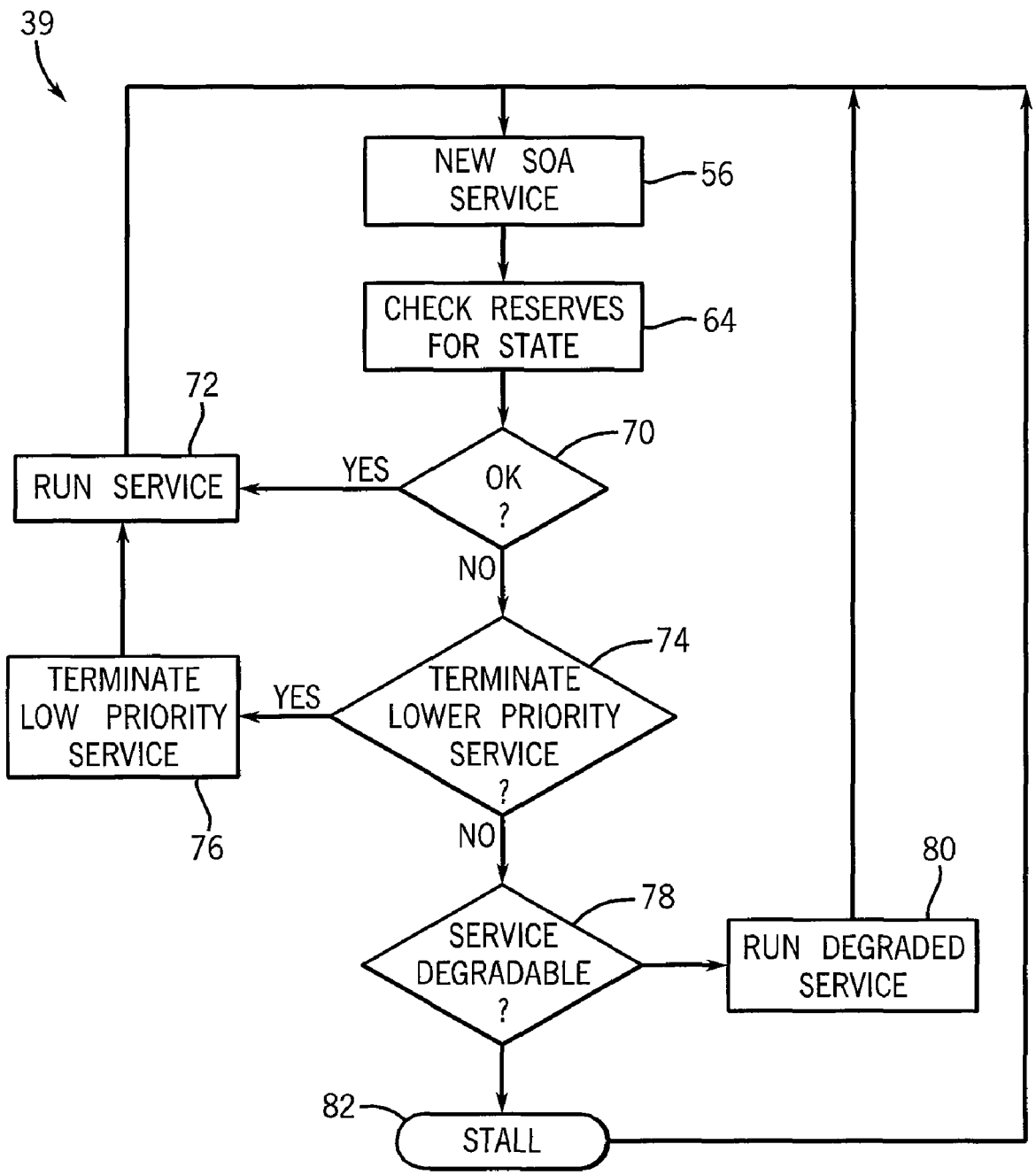
FIG. 4 is a flow chart of the resource management program of FIG. 3.
Figure 5:
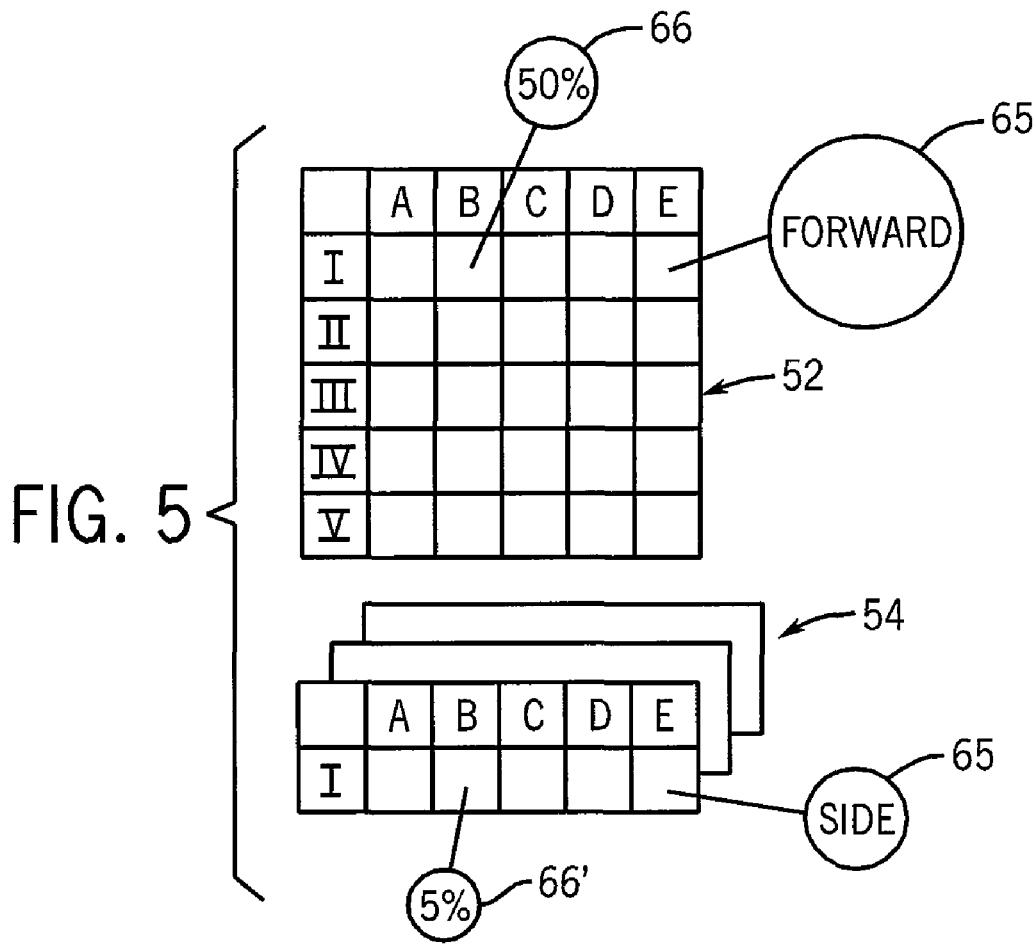
FIG. 5 is a data structure diagram of reserve and burden models used by the resource manager.

Referring now to FIGS. 3, 4 and 5, during operation of the machine 12, the resource allocation program 39 may be invoked at each control cycle 40 to check for new service requests as indicated by initiation block 56.

At succeeding process block 64 the resource allocation program 39 determines a current state of the control process as derived from the input output variables of the I/O table 42. In this regard, the state machine 43, on each cycle 40, updates a state machine providing a state variable uniquely determined by the history of input and output variables. For a missile system, for example, the states will be selected to be logically related to the function of the missile including: a launch state, a flight state, a targeting state, etc. In certain situations, a dedicated state machine 43 may not be required as the state machine may be implemented by the control programs 36 themselves which may deduce states as part of their normal operation.

Knowledge of the function of the weapons system allows the states to serve as a proxy for predictably different processing burdens for the control system 10. Thus, for example, during the launch state, when many delicate sensor systems are shut down, the processing burden may be relatively light in contrast to the targeting state when sensor and actuator systems data may be used in their fullest capacity. Note that it is not necessary that this identification of the states accurately predict processing resource burdens; they are used simply as a framework for subsequent empirical measurements.

Referring now to FIG. 5, before operation of the control system 10 and after a set of states has been defined and the appropriate state machine 43 created (generating a unique state variable value for each state from the history of control variables), measurements are made of the execution of the control programs 36 in an instrumented environment. This environment accurately simulates operation of the machine 12 while monitoring the reserves of each of the processing resources 24a, 24b, 26, 28, 30, 14 etc. These measurements are used to construct a model of resource reserves, in the simplest case being a resource table 52. Resource table 52 provides for columns associated with each processing resource (here labeled A-E and representing generally processors 24a and 24b, bus 26, memory 28, radio transceiver 30, as well as hardware elements such as sensor 14). Each row of the resource table 52 is identified as a different state (value of the state variable) here labeled I-V. Each cell of the resource table 52 describes an available reserve 66 of processing power for the particular processing resource, being a percentage, for example 80%, of the reserve determined during the empirical measurements. The states, and hence the measurements of processing reserve, may be averaged to a period equal to the time of cycle 40, or when multiple cycle times are admitted, the time of the slowest cycle 40. For some cells of the table 52, notably those for hardware elements such as sensor 14, the table entry provides for the equipment state 65. For example, in a pivotable camera sensor 14, the camera may face forward or to the side, each of these states being mutually exclusive.

As noted above, the states need not perfectly demarcate different demands on the processing resources as any errors will be compensated for by the empirical measurements or will only slightly affect full utilization of resources. However once the states have been defined based on measurements of the actual system, the measurements may be eliminated and the states alone used during actual operation of the control system, 10 greatly reducing the demand on processing resources.

Referring still to FIG. 5, a similar process used to create burden table 54 which provides data for each of the asynchronous services 46a and 46b (rows) indicating the incremental burden 66' that execution of the service will be upon each of the resources or indicating the necessary equipment state 65' (columns) required for the execution of the service such as are derived from the service parameter 60 (not empirically measured).

Referring again to FIG. 4, accordingly, at process block 64 of the resource allocation program 39, the current state is determined and the burden 66' from the pending service 46a, 46b is compared against the reserves 66 for each programming resource minus the burdens 66' of any previously accepted services. This process requires very little computational burden (simply looking up and subtracting data) and need not be performed frequently but only upon state changes. Note that as long as the burdens 66' for the services are less than the remaining reserve 66 for each processing resource, the service 46a, 46b may be accepted. For the equipment state 65' however, there must be a perfect match to the equipment state 65. Evaluation is a logical ANDing of the evaluations for each of the different processing resources.

Referring again to FIG. 4, if at decision block 70 the reserves 66 can accommodate the burdens 66' of the added service 46a, 46b, the service 46a, 46b is run as indicated by process block 72. Alternatively at decision block 70, if the service 46a, 46b cannot be accommodated, the program 39 proceeds to decision block 74 to investigate whether there are currently executing services 46a, 46b having a lower service priority. If such services 46a, 46b exist, they may be terminated as indicated by process block 76 and the new service 46a, 46b run as indicated by process block 72. The resource allocation program 39 provides notification that the lower priority service 46a, 46b has been terminated.

If there are no lower priority services 46a, 46b to be terminated, at decision block 78, the program 38 investigates whether the pending service 46a, 46b can be offered in a degraded form. This degradation is possible if there are multiple versions of the service having different burdens or if the service has a cyclic parameter, for example frames per second in the case of the video service, which may be quantitatively reduced. If service degradation is possible, the resource allocation program 39 negotiates with the service requester for degraded service 46a, 46b. If such negotiation is successful, then at process block 80 the degraded service is executed.

If at decision block 78, a degraded service 46a, 46b is not possible or acceptable, the resource allocation program 39 may stall the service as indicated by process block 82 to be re-requested after a predetermined hold off time or upon change of state or a request by yet another service.

By employing processing system state as a proxy for processor resource reserve, and by evaluating an entire set of programs 36 representing the synchronous component of the execution of the control system, a higher level, simpler resource allocation may be undertaken on a less frequent basis preserving essential processor resources.

The present invention has been described in terms of the preferred embodiment, and it is recognized that equivalents, alternatives, and modifications, aside from those expressly stated, are possible and within the scope of the appending claims.

We claim:

1. A method for executing non real-time services on a computer system providing real-time control of equipment via control variables representing inputs and outputs to and from the equipment, the computer system having different processing resources and a plurality of predefined operating states logically related to the real-time control of the equipment, the method comprising the steps executed on the computer system of:
    (a) characterizing the operating state of the computer system as one of the predefined operating states during real-time control based on the control variables;
    (b) providing a resource model providing predefined processing reserves of at least one processing resource as a function of operating state, said operating state serving as a proxy for processing reserves;
    (c) providing a burden model of asynchronous non real-time services indicating an incremental burden to at least one processing resource for each asynchronous service; and
    (d) during operation of the computer system, upon each request for execution of an asynchronous service, evaluating a sum of incremental burdens of currently operating asynchronous services against the processing reserve of at least one processing resource for a particular operating state to determine whether or how to execute the service.

2. The method of claim 1 wherein the resource model provides reserves of multiple processing resources, and the burden model provides incremental burdens for the multiple processing resources, and the evaluation of step (d) evaluates the sum of incremental burdens of currently operating asynchronous services against the reserves of corresponding processing resources for each of the multiple processing resources independently.

3. The method of claim 1 wherein the operating state is deduced both from current and historical control variables.

4. The method of claim 1 wherein steps (a)-(d) are executed synchronously with tasks of the real-time control executed by the computer system.

5. The method of claim 1 wherein the processing resources are selected from the group consisting of: processors, buses, radio links, memory, and equipment components.

6. The method of claim 1 wherein the resource model is derived from empirical measurements of the computer system executing the control tasks and wherein the reserves use a reduced percentage from the empirical measurement.

7. The method of claim 1 wherein the asynchronous services have assigned priorities based on a requester of the asynchronous service and wherein step (d) includes the step of canceling lower priority asynchronous services upon a request for execution of a higher priority asynchronous service when the evaluation of step (d) indicates lack of sufficient reserve for the higher priority asynchronous service.

8. The method of claim 1 wherein step (d) includes the step of negotiating a degraded execution of the asynchronous service when evaluation of step (d) indicates lack of sufficient reserve for the asynchronous service.

9. The method of claim 1 wherein step (d) includes the step of delaying execution of the asynchronous service when evaluation of step (d) indicates lack of sufficient reserve for the asynchronous service.

10. The method of claim 1 wherein the asynchronous services include hardware state parameters and wherein the resource model also indicates hardware states; and wherein step (d) further evaluates hardware state parameters in a request for execution of an asynchronous service against the hardware states of the resource model to determine whether to execute the service.

11. The method of claim 1 wherein the burden model evaluates the asynchronous service on a timeframe substantially equal to a slowest cycle time of control tasks executing to provide the real-time control.

12. A control system for a machine having control actuators and sensors, the control system comprising:
    a computer system having different processing resources communicating with control actuators and sensors and having a plurality of predefined operating states logically related to the real-time control of the equipment;
    control programs synchronously executing on the computer system providing real-time control of the control actuators and sensors via control variables representing inputs and outputs to and from the control actuators and sensors;
    a state machine executing on the computer and at least one of an input and output value to generate the operating state as one of the predefined operating states in a finite state machine;
    a resource manager receiving the state from the state machine to:
    (i) provide a resource model providing predefined processing reserves of at least one processing resource as a function of the operating state, said operating state serving as a proxy for processing reserves;
    (ii) determine an incremental burden to the at least one processing resource for a pending asynchronous non real-time service; and (iii) evaluate a sum of incremental burdens of currently operating asynchronous services against the processing reserve to determine how to process the pending service.

13. The control system of claim 12 wherein the state machine and resource manager are executed synchronously with the control program.

14. The control system of claim 12 wherein the processing resources are selected from the group consisting of: processors, buses, radio links, memory, and control actuators, and sensors.

15. The control system of claim 12 wherein the resource model is derived from a lookup table holding empirical measurements of reserves of the processing resources as a function of operating state.

16. The control system of claim 12 wherein the asynchronous services have assigned priorities based on a requester of the asynchronous service and wherein the resource manager cancels lower priority asynchronous services in response to a pending asynchronous service of higher priority when evaluation of the sum of incremental burdens indicates a lack of sufficient reserve for the pending asynchronous service.

17. The control system of claim 12 wherein the resource manager degrades the pending asynchronous service when evaluation of the sum of incremental burdens indicates a lack of sufficient reserve for the pending asynchronous service.

18. The control system of claim 12 wherein the resource manager delays the pending asynchronous service when evaluation of the sum of incremental burdens indicates a lack of sufficient reserve for the pending asynchronous service.

19. The control system of claim 12 wherein the asynchronous services include hardware state parameters and wherein the resource manager further evaluates hardware state parameters in a request for execution of an asynchronous service against hardware states of the resource model to determine whether to execute the service.

* * * * *